(12) United States Patent
Li et al.

(10) Patent No.: US 11,641,797 B2
(45) Date of Patent: May 9, 2023

(54) MOWER

(71) Applicant: Globe (Jiangsu) Co., Ltd, Jiangsu (CN)

(72) Inventors: Wanghao Li, Jiangsu (CN); Jin Cao, Jiangsu (CN); Jie Gao, Jiangsu (CN); Van Cuong Bui, Jönköping (SE); Johanna Olsson, Jönköping (SE)

(73) Assignee: Globe (Jiangsu) Co., Ltd, Changzhou (CN)

( * ) Notice: Subject to any disclaimer, the term of this patent is extended or adjusted under 35 U.S.C. 154(b) by 274 days.

(21) Appl. No.: 17/029,759

(22) Filed: Sep. 23, 2020

(65) Prior Publication Data
US 2021/0084815 A1 Mar. 25, 2021

(30) Foreign Application Priority Data

Sep. 23, 2019 (CN) .......................... 201910898313.6

(51) Int. Cl.
*A01D 34/74* (2006.01)
*A01D 101/00* (2006.01)
*A01D 34/00* (2006.01)

(52) U.S. Cl.
CPC ........... *A01D 34/74* (2013.01); *A01D 34/008* (2013.01); *A01D 2101/00* (2013.01)

(58) Field of Classification Search
CPC ... A01D 34/74; A01D 34/008; A01D 2101/00
USPC ........................................................ 56/17.1
See application file for complete search history.

(56) References Cited

U.S. PATENT DOCUMENTS

| 4,187,924 A | 2/1980 | Deschamps |
| 2015/0181805 A1 | 7/2015 | Elonsson |
| 2017/0181375 A1 | 6/2017 | Hashimoto et al. |

FOREIGN PATENT DOCUMENTS

| CN | 107211645 A | * 9/2017 |
| DE | 202018100842 U1 | 5/2018 |
| EP | 2783563 A1 | 10/2014 |

OTHER PUBLICATIONS

CN107211645A (Zhu,J) (Sep. 29, 2017), (machine translation). (Year: 2017).*
Extended European Search Report of counterpart European Patent Application No. 20197687.5 dated Feb. 17, 2021.

* cited by examiner

*Primary Examiner* — Mahmoud Gimie

(57) ABSTRACT

The invention provides a mower. The mower comprises a housing and a cutting device arranged in the housing. The mower is provided with a height adjustment device. The height adjustment device comprises a rotating member and a traction member arranged on the housing. One end of the traction member is fixed on the rotating member, and the other end of the traction member is fixed on the cutting device. The rotating member rotates to drive the traction member to adjust the height of the cutting device. Such an arrangement makes the mower have a simple structure, save internal space of the mower, and be convenient to operate.

9 Claims, 6 Drawing Sheets

MOWER

CROSS-REFERENCE TO RELATED INVENTIONS

This invention is a US invention which claims the priority of CN invention Serial No. 201910898313.6, filed on Sep. 23, 2019, the disclosures of which are hereby incorporated by reference in their entirety.

TECHNICAL FIELD

The invention relates to the field of garden tools, in particular to a mower.

BACKGROUND ART

The mower is a common tool for maintaining the lawn. In the course of its work, it is necessary to adjust the height of the cutting blade to adjust the height of the mower. In the prior art, the screw is mainly matched with the cutting blade, and the height of the cutting blade is adjusted by rotating the screw. This method occupies more space inside the mower, which greatly limits the design of the internal structure of the mower and also causes the entire mower to be larger. In addition, in order to accurately indicate the current height of the cutting blade, it is necessary to ensure that the screw must be installed at a specific angle. If there is an error between the screw and the mating thread during installation, the accurate indication and adjustment of the cutting height cannot be achieved, so the operation is more complicated.

Therefore, it is necessary to design a mower to solve the above problems.

SUMMARY OF INVENTION

An object of the present invention is to provide a mower that is convenient for adjusting the height of a cutting device. In order to achieve the above object, the present invention adopts the following technical solution: a mower including a housing and a cutting device provided in the housing. The mower is provided with a height adjusting device, and the height adjusting device includes a rotating member and a traction member provided on the housing. One end of the traction member is fixed on the rotating member, and the other end of the traction member is fixed on the cutting device. The rotating member rotates and drives the traction member to adjust the height of the cutting device.

According to one example embodiment, the rotating member comprises a main body located outside the housing, a mounting portion extending into the housing, and a step portion between the main body and the mounting portion. A first elastic member is sleeved on the mounting portion. One end of the first elastic member is in contact with the housing, and the other end is in contact with the mounting portion. The tension of the first elastic member makes the rotating member connect to the housing tightly.

According to another example embodiment, the step portion is located above the housing and is in contact with the housing, and the two surfaces of the step portion and the housing that are in contact with each other are provided with meshing tooth surface to limit the rotation of the rotating member. The step portion is provided with an annular groove for receiving the traction member.

According to another example embodiment, the other end of the traction member is fixed at the top center of the cutting device, and a corresponding position of the housing is provided with a through hole through which the traction member passes.

According to another example embodiment, a second elastic member is provided between the housing and the cutting device. The second elastic member is in a compressed state and its two ends being respectively connect to the housing and the cutting device.

According to another example embodiment, the housing is provided with a first protrusion facing the cutting device, and the cutting device is provided with a second protrusion corresponding to the first protrusion. The two ends of the elastic member respectively are sleeved on the first protrusion and the second protrusion.

According to another example embodiment, the number of the second elastic members is more than two and is evenly distributed on the top of the cutting device. The second elastic member is a spring, and the traction member is a steel wire rope.

According to another example embodiment, an annular rib surrounding the rotating member is provided on the housing, and a groove is formed on the annular rib for the traction member to pass through. Stopper portions are provided on both sides of the groove, and the rotating member is provided with a limiting block that cooperates with the stopper portions to limit the rotation range of the rotating member to be less than 360°.

According to another example embodiment, the rotating member rotates along a vertical axis, the main body is provided with a cylindrical surface and a vertical surface, and the limiting block is provided on the vertical surface. Two protrusions are symmetrically provided at the end of the mounting portion, and the other end of the first elastic member abuts the two protrusions. The rotating member further includes a knob, and the knob is elastically buckled on the main body.

According to another example embodiment, the mower further comprises a walking wheel supporting the housing. The cutting device comprises a motor assembly and a cutting assembly fixed below the motor assembly It can be known from the above technical solutions that the mower of the present invention is provided with a height adjusting device on the housing, and the rotating member is connected to the cutting device through a traction member. The traction member is driven by the rotation of the rotating member to adjust the height of the cutting device. This arrangement makes the adjustment of the cutting device be simple and convenient to operate.

DESCRIPTION OF EMBODIMENT

In order to make the objectives, technical solutions, and advantages of the present invention clearer, the following describes the present invention in detail with reference to the accompanying drawings and specific embodiment.

Figure 1:
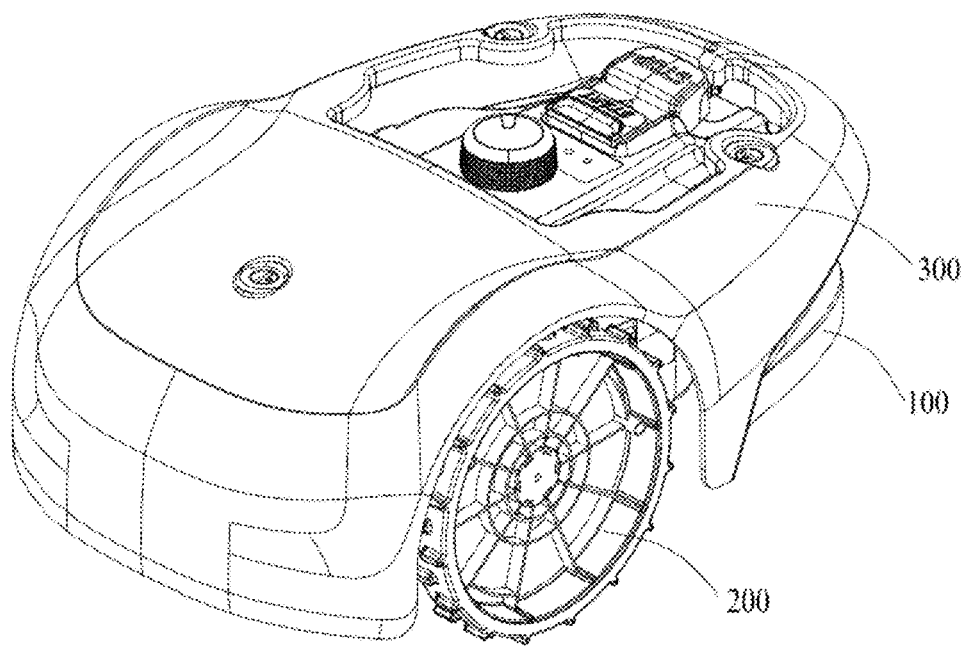
FIG. 1 illustrates an example of a mower.

As shown in FIG. 1, the present invention provides a mower, which includes a base 100, a walking wheel 200 mounted on the base 100 to support the base 100 to walk, and a cover 300 movably mounted above the base 100. The walking wheel 200 includes two universal wheels located at the front of the base 100 and two driving wheels located at the rear of the base 100.

Figure 2:
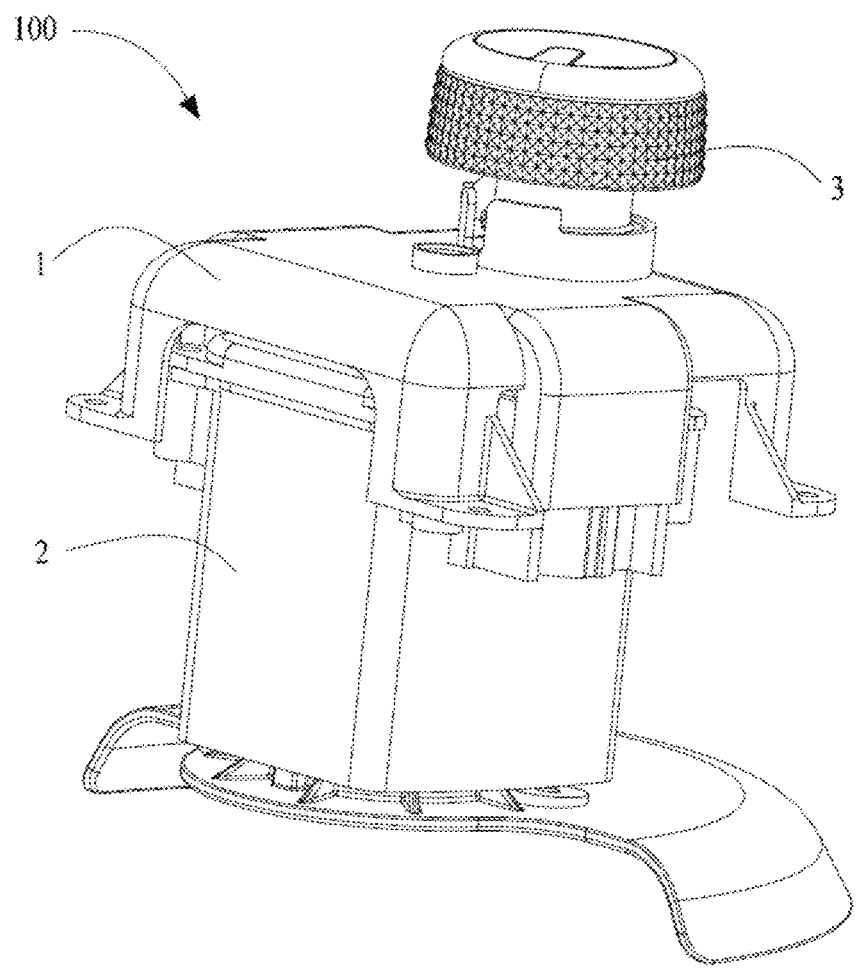
FIG. 2 illustrates a schematic view of the height adjusting device according to an example embodiment.
Figure 3:
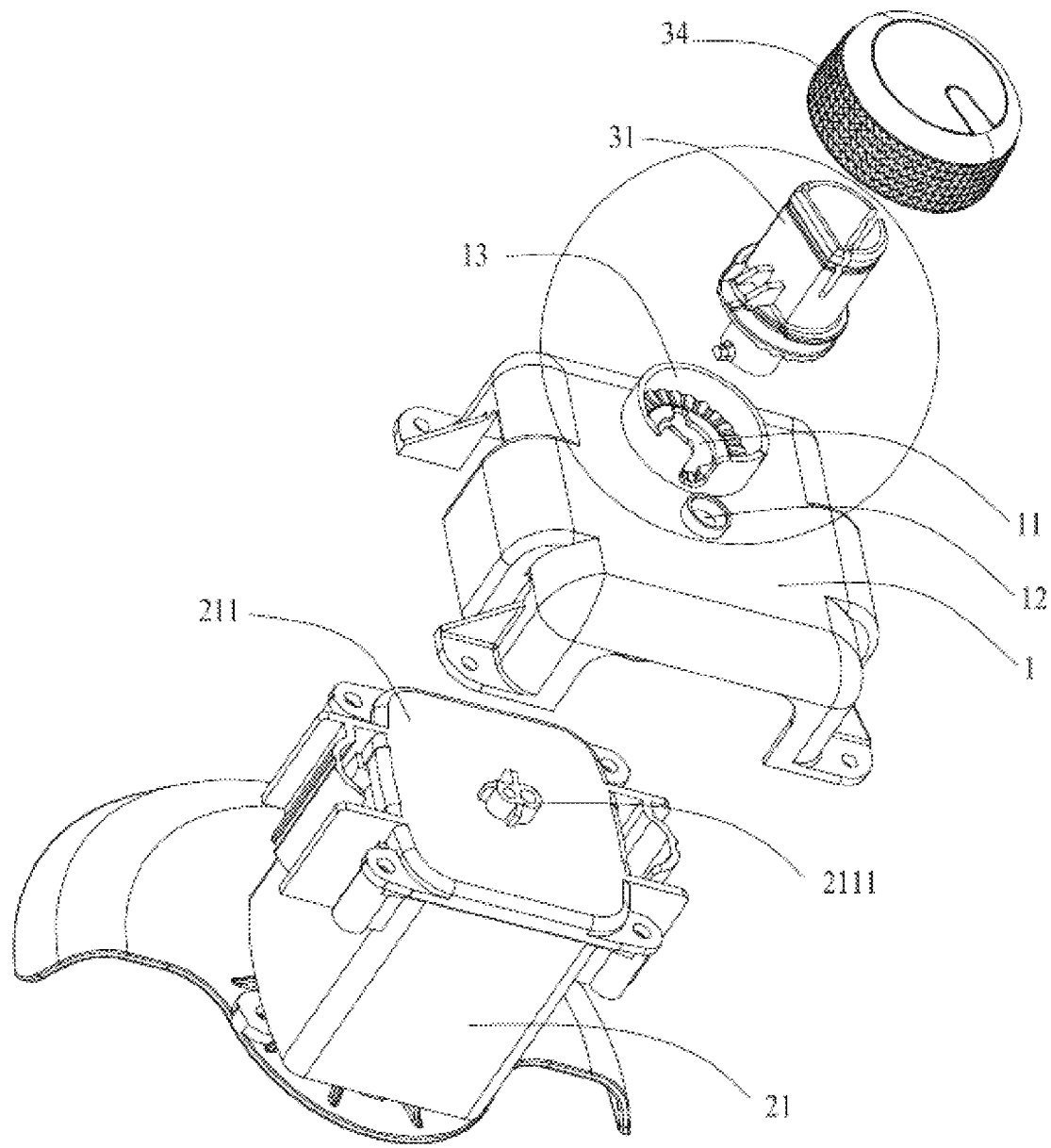
FIG. 3 illustrates an exploded view of the height adjusting device according to an example embodiment.

Please refer to FIG. 2 and FIG. 3, the base 100 includes a housing 1, a cutting device 2 and a height adjusting device disposed in the housing 1. The cutting device 2 includes a motor assembly 21 and a cutting assembly fixed below the motor assembly 21. The motor assembly 21 includes a motor case 211.

Figure 6:
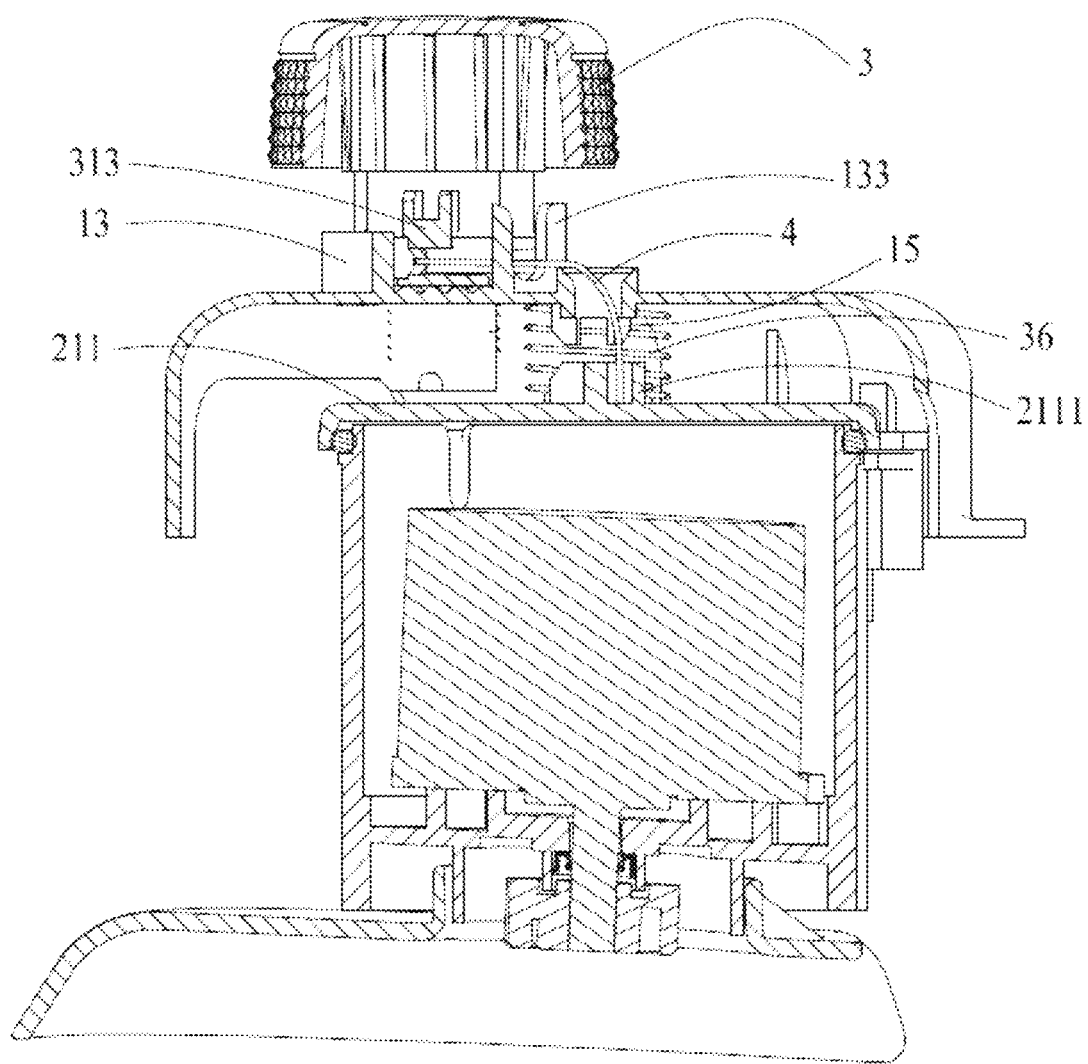
FIG. 6 illustrates a cross-sectional view of the height adjusting device according to an example embodiment.
Figure 7:
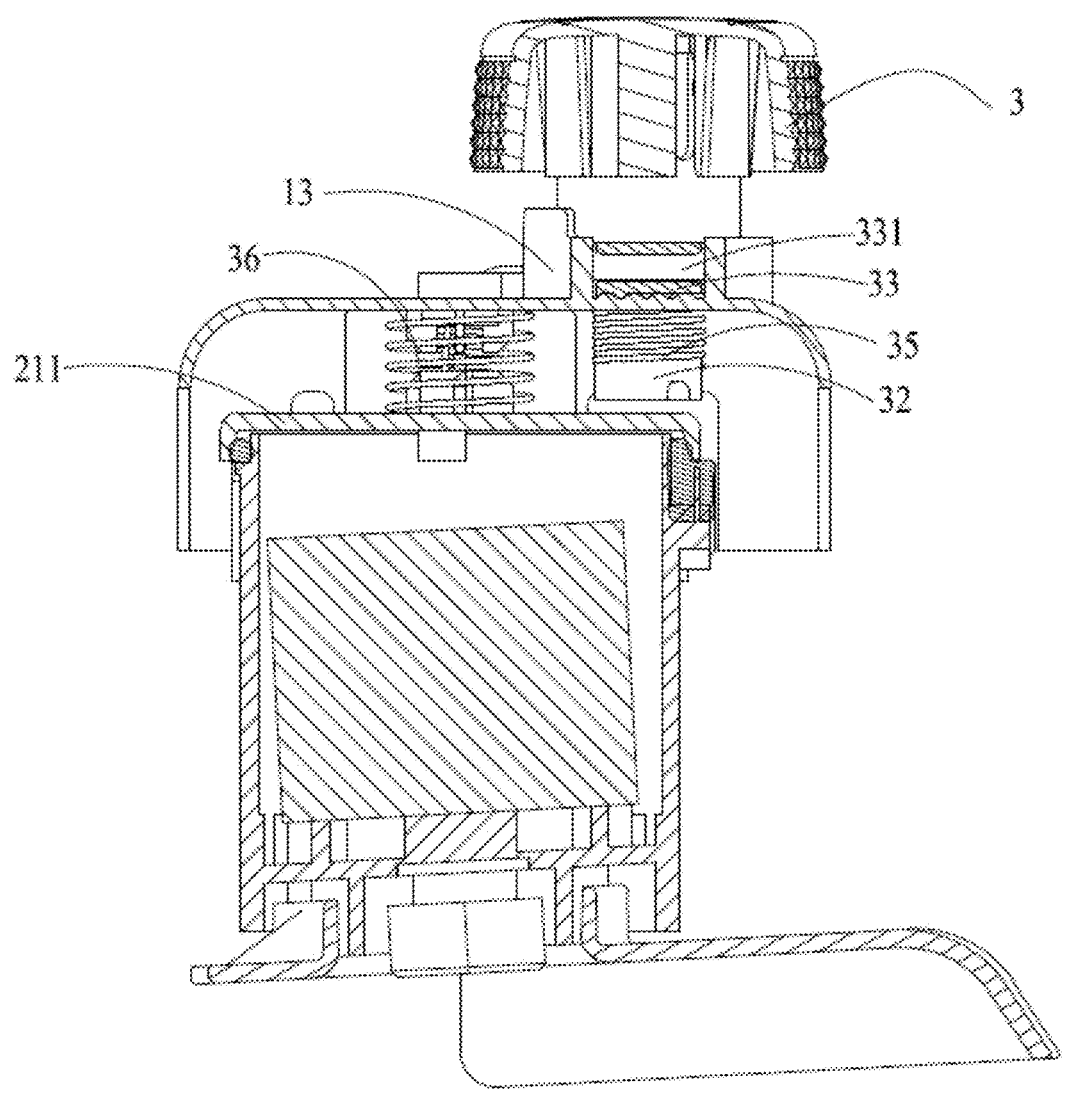
FIG. 7 illustrates a cross-sectional view of the height adjusting device according to an example embodiment.

Please refer to FIG. 3 and FIG. 6, the height adjusting device is installed on the housing 1, and the cutting device 2 moves up and down along the body 100 to change the height of the cutting device 2. Specifically, the height adjusting device includes a rotating member 3 and a traction member 4 provided on the housing 1. The rotating member 3 is disposed above the housing 1, and a rotation axis of the rotating member 3 is located in a vertical direction.

One end of the traction member 4 is fixed to the rotating member 3 and the other end is fixed to the cutting device 2. Specifically, the other end is fixed to the top center position of the motor case 211. The rotating member 3 rotates and drives the traction member 4 to adjust the height of the cutting device 2 in the vertical direction. The traction member 4 is specifically a rope structure. In the present invention, the traction member 4 is preferably a steel wire rope, and the elongation is less than 1.5%.

As shown in FIG. 3, the housing 1 is provided with a through hole 12 through which the traction member 4 passes. The position of the through hole 12 is corresponding to the top center position of motor case 211. Please refer to FIG. 4 and FIG. 6, the housing 1 is further provided with a mounting hole 11 for mounting the rotating member 3, and the rotating member 3 partially extends into the housing 1. The rotating member 3 specifically includes a main body 31, a mounting portion 32 protruding into the housing 1, and a step portion 33 between the main body 31 and the mounting portion 32. The step portion 33 is formed with an annular groove 331 for receiving the traction member 4 which is rolled up. The mounting portion 32 extends into the housing 1 through the mounting hole 11, and the step portion 33 is located above the mounting hole 11 and contacts with the housing 1. The rotating member 3 further includes a knob 34 for a user to screw, and the knob 34 is elastically buckled on the main body 31. A height indicator is provided on the top of the knob 34.

Please refer to FIG. 3 to FIG. 7, the height adjusting device further includes a first elastic member 35 sleeved on the outside of the mounting portion 32. One end of the first elastic member 35 abuts against the housing 1 and the other end abuts against the mounting portion 32. The tension of the first elastic member 35 makes the rotating member 3 and the housing 1 tightly connected. The first elastic member 35 is preferably a spring, and its outer diameter is larger than that of the mounting hole 11. Specifically, two protrusions 321 are symmetrically arranged at the ends of the mounting portion 32 in the radial direction, and one end of the first elastic member 35 abuts on the two protrusions 321. An opening 111 is formed on the edge of the mounting hole 11 to match the protrusions 321, which facilitates the protrusions 321 to pass downward from the top of the housing 1 during assembly. After assembly, the first elastic member 35 is in a compressed state, which exerts an upward force on the housing 1 and a downward force on the mounting portion 32 of the rotating member 3, so that the rotating member 3 and the housing 1 are connected tightly in the vertical direction and not easy to loosen.

A second elastic member 36 is provided between the housing 1 and the cutting device 2, and the second elastic member 36 is disposed between the housing 1 and the cutting device 2 in a compressed state. Preferably, the second elastic member 36 is a spring. The housing 1 is provided with a first protrusion 15 protruding toward the cutting device 2. The cutting device 2 is provided with a second protrusion 2111 protruding toward the housing 1 which is corresponding to the first protrusion 15. The upper and lower ends of the second elastic member 36 are respectively sleeved on the first protrusion 15 and the second protrusion 2111. Preferably, the first protrusion 15 is disposed below the through hole 12, and the traction member 4 passes through the through hole 12 and the second elastic member 36 and is fixedly connected to the second protrusion 2111. In other embodiment, a plurality of the second elastic members 36 may be provided and evenly distributed on the top of the cutting device 2, so that each position between the housing 1 and the cutting device 2 is uniformly stressed.

The two surfaces on which the rotating member 3 and the housing 1 are in contact with each other are provided with meshing tooth surface to restrict the rotation of the rotating member 3. The meshing tooth surface is specifically a matched wave-shaped meshing surface arranged along the radial direction of the rotating member 3. The rotating member 3 is in tight contact with the housing 1, so that the rotating member 3 is difficult to rotate. In addition, due to the tension of the first elastic member 35, the rotating member 3 is subjected to a downward force and the housing 1 is subjected to an upward force. The two are closely coupled to prevent the rotating member 3 from being rotated by the pulling of the traction member 4.

Figure 4:
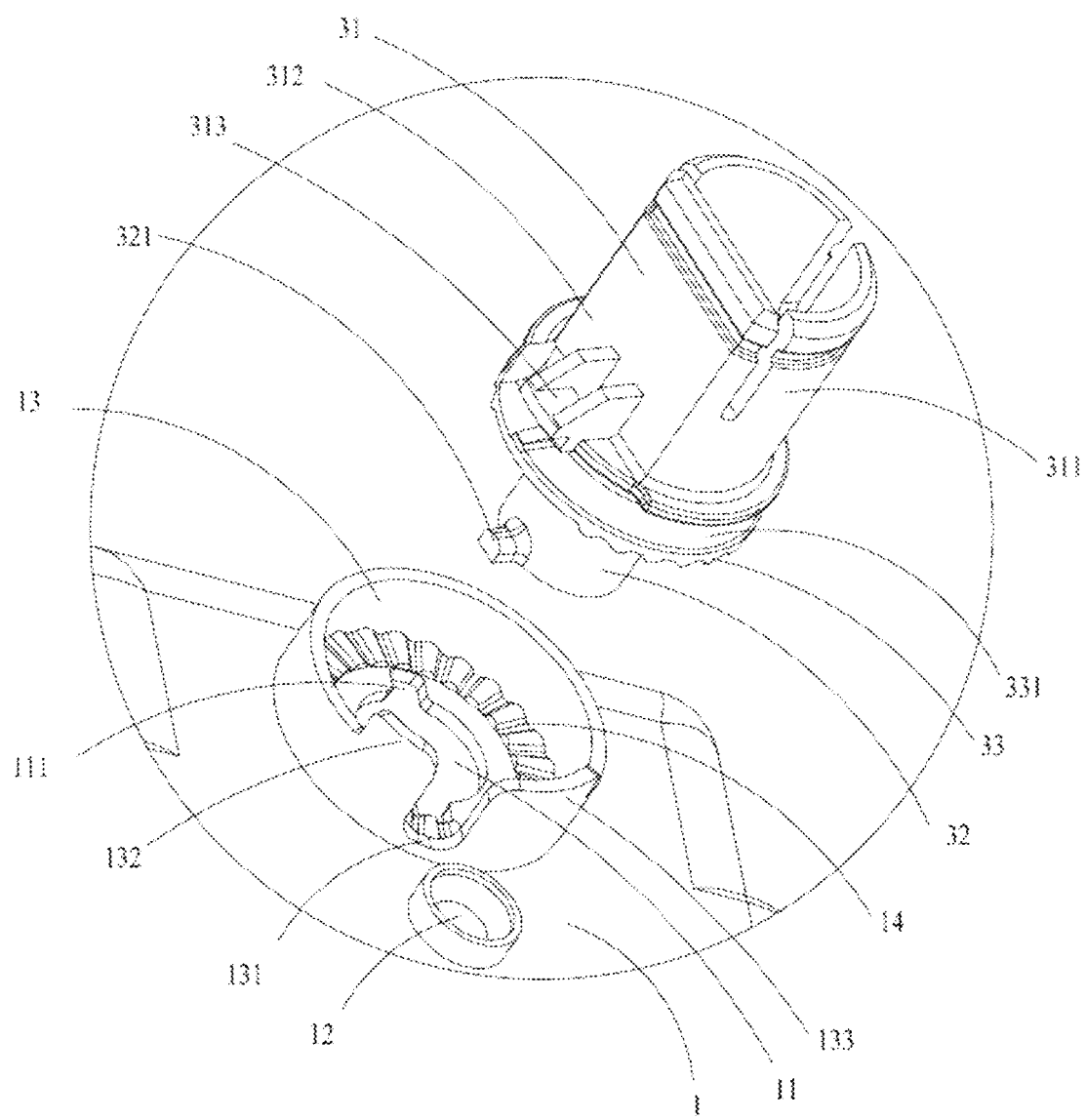
FIG. 4 illustrates an enlarged view of a circled portion according to an example embodiment.
Figure 5:
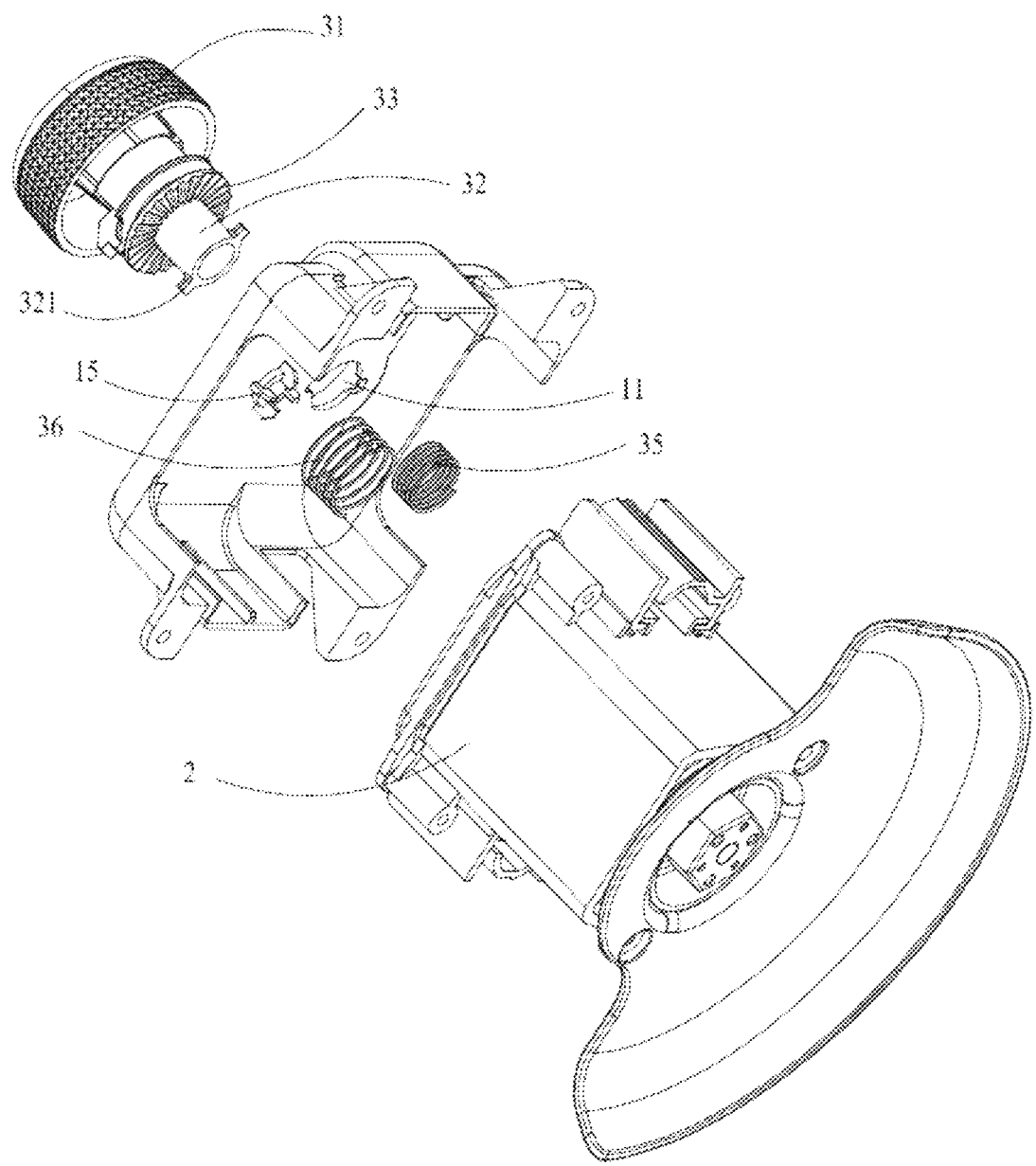
FIG. 5 illustrates an exploded view of the height adjusting device according to an example embodiment.

As shown in FIG. 4, the housing 1 is provided with an annular rib 13 surrounding the rotating member 3. The annular rib 13 is provided with a groove 131 through which the traction member 4 passes, and the groove 131 is disposed adjacent to the through hole 12. The annular rib 13 is provided with stopper portions 132 and 133 protruding upward, and the rotating member 3 is provided with a limiting block 313 that cooperates with the stopper portions 132 and 133 to limit the rotation range of the rotating member 3. Preferably, the main body 31 is provided with a cylindrical surface 311 and a vertical surface 312, and the limiting block 313 is provided on the vertical surface 312. The rotation radius of the limiting block 313 is larger than that of the annular rib 13. The rotating member 3 rotates between the two stopper portions 132 and 133. Therefore, the rotation angle of the rotating member 3 is less than 360°, thereby limiting the range in which the cutting device 2 moves up and down. In other embodiment, the length range of the traction member 4 can also be adjusted by adjusting the diameter of the annular groove 331 on the rotating member 3, thereby changing the adjustable height range of the cutting device 2.

When the cutting device 2 is at the lowest position, the limiting block 313 abuts the stopper portion 132 and the traction member 4 is in a fully expanded state. When the cutting device 2 needs to be raised, turn the knob 34 clockwise and drive the rotating member 3 to rotate synchronously. The traction member 4 is continuously wound on the rotating member 3. The cutting device 2 moves upward with the traction member 4 and stops rotating when it reaches the expected height. The knob 34 is fixed at the corresponding position due to the cooperation between the meshing tooth surface and the first elastic member 35. Continue to turn the knob 34 clockwise until the limiting block 313 abuts the stopper portion 133. At this time, the height of the cutting device 2 is at an adjustable maximum height. As the elongation of the steel wire rope is less than 1.5%, the rotation angle of rotating part 3 corresponds to different cutting height, the cutting height can be accurately displayed.

In summary, the mower of the present invention is provided with a height adjusting device on the housing, and the rotating member is connected to the cutting device through a traction member. The traction member is driven by the rotating member to adjust the height of the cutting device. Such an arrangement not only makes the mower have a simple structure, save internal space of the mower, but also be convenient to operate.

The above embodiment is only used to illustrate the present invention and not to limits the technical solutions described in the present invention. The understanding of this specification should be based on those skilled in the art, although the present invention has been described in detail with reference to the above embodiment. However, those skilled in the art should understand that those skilled in the art can still modify or equivalently replace the present invention, and all technical solutions and improvements that do not depart from the spirit and scope of the present invention should be within the scope of the claims of the invention.

The invention claimed is:

1. A mower, comprising:
a housing;
a cutting device located in the housing; and
a height adjusting device, and the height adjusting device including a rotating member and a traction member,
wherein one end of the traction member is fixed on the rotating member and the other end of the traction member is fixed on the cutting device,
wherein the traction member is driven by the rotating member to adjust the height of the cutting device;
wherein the other end of the traction member is fixed at the top center of the cutting device, and a corresponding position of the housing is provided with a through hole through which the traction member passes.

2. The mower according to claim 1, wherein a second elastic member is provided between the housing and the cutting device, the second elastic member being in a compressed state and its two ends being respectively connected to the housing and the cutting device.

3. The mower according to claim 2, wherein the number of the second elastic members is more than two and is evenly distributed on the top of the cutting device, the second elastic member is a spring, and the traction member is a steel wire rope.

4. The mower according to claim 1, wherein the mower further comprises a walking wheel supporting the housing, the cutting device comprising a motor assembly and a cutting assembly.

5. A mower, comprising:
a housing;
a cutting device located in the housing; and
a height adjusting device, and the height adjusting device including a rotating member and a traction member,
wherein one end of the traction member is fixed on the rotating member and the other end of the traction member is fixed on the cutting device,
wherein the traction member is driven by the rotating member to adjust the height of the cutting device,
wherein the rotating member comprises a main body located outside the housing, a mounting portion extending into the housing, and a step portion between the main body and the mounting portion, a first elastic member being sleeved on the mounting portion, one end of the first elastic member being in contact with the housing, and the other end being in contact with the mounting portion, the first elastic member is configured to make the rotating member connect to the housing tightly.

6. The mower according to claim 5, wherein the step portion is located above and butts with the housing, and the two surfaces of the step portion and the housing that are in contact with each other are provided with meshing tooth surface to limit the rotation of the rotating member, the step portion being provided with an annular groove for receiving the traction member.

7. The mower according to claim 5, wherein an annular rib surrounding the rotating member is provided on the housing, and a groove is formed on the annular rib for the traction member to pass through, a stopper portions being provided on both sides of the groove, and the rotating member being provided with a limiting block that cooperates with the stopper portions to limit the rotation range of the rotating member to be less than 360°.

8. The mower according to claim 7, wherein the rotating member rotates along a vertical axis, the main body is provided with a cylindrical surface and a vertical surface, and the limiting block is provided on the vertical surface, two protrusions being symmetrically provided at the end of the mounting portion, and the other end of the first elastic member abutting the two protrusions, the rotating member further including a knob, and the knob being elastically buckled on the main body.

9. A mower, comprising:
a housing;
a cutting device located in the housing; and
a height adjusting device, and the height adjusting device including a rotating member and a traction member,
wherein one end of the traction member is fixed on the rotating member and the other end of the traction member is fixed on the cutting device,
wherein the traction member is driven by the rotating member to adjust the height of the cutting device,
wherein a second elastic member is provided between the housing and the cutting device, the second elastic member being in a compressed state and its two ends being respectively connected to the housing and the cutting device, wherein the housing is provided with a first protrusion facing the cutting device, and the cutting device is provided with a second protrusion corresponding to the first protrusion, the two ends of the elastic member respectively being sleeved on the first protrusion and the second protrusion.

* * * * *